United States Patent [19]
Torimaru

[11] Patent Number: 5,621,177
[45] Date of Patent: Apr. 15, 1997

[54] ELECTROMAGNETIC FLOWMETER

[75] Inventor: Takashi Torimaru, Tokyo, Japan

[73] Assignee: Yokogawa Electric Corporation, Tokyo, Japan

[21] Appl. No.: 514,877

[22] Filed: Aug. 14, 1995

[30] Foreign Application Priority Data

Mar. 2, 1995 [JP] Japan .................................. 7-042972

[51] Int. Cl.$^6$ .................................................. G01F 1/00
[52] U.S. Cl. ...................................... 73/861.16; 73/861.12
[58] Field of Search ........................... 73/861.12, 861.16, 73/861.17

[56] References Cited

U.S. PATENT DOCUMENTS 4,704,907  11/1987  Mannherz et al. .................. 73/861.17
4,766,770   8/1988  Mannherz et al. .................. 73/861.17

Primary Examiner—Richard Chilcot
Assistant Examiner—Ronald Biegel
Attorney, Agent, or Firm—Moonray Kojima

[57] ABSTRACT

An electromagnetic flowmeter for converting flow rate of a fluid to be measured into an electrical signal and for outputting a flow rate signal corresponding to the flow rate using detecting electrodes, comprising exciting means for applying a magnetic field to the fluid with an excitation period thereof being shorter than the non-exciting period; AC coupling means for obtaining an AC signal through AC coupling of signals outputted from the electrodes sample and hold means for sampling and holding the AC signals with a sampling signal having a sampling width including portions before and after the excitation period, and for outputting the resulting sample and hold signal as a hold signal; switching means for changing a reference potential before and after the sample and hold; and signal processing means for processing the hold signal to produce the flow rate signal.

26 Claims, 7 Drawing Sheets

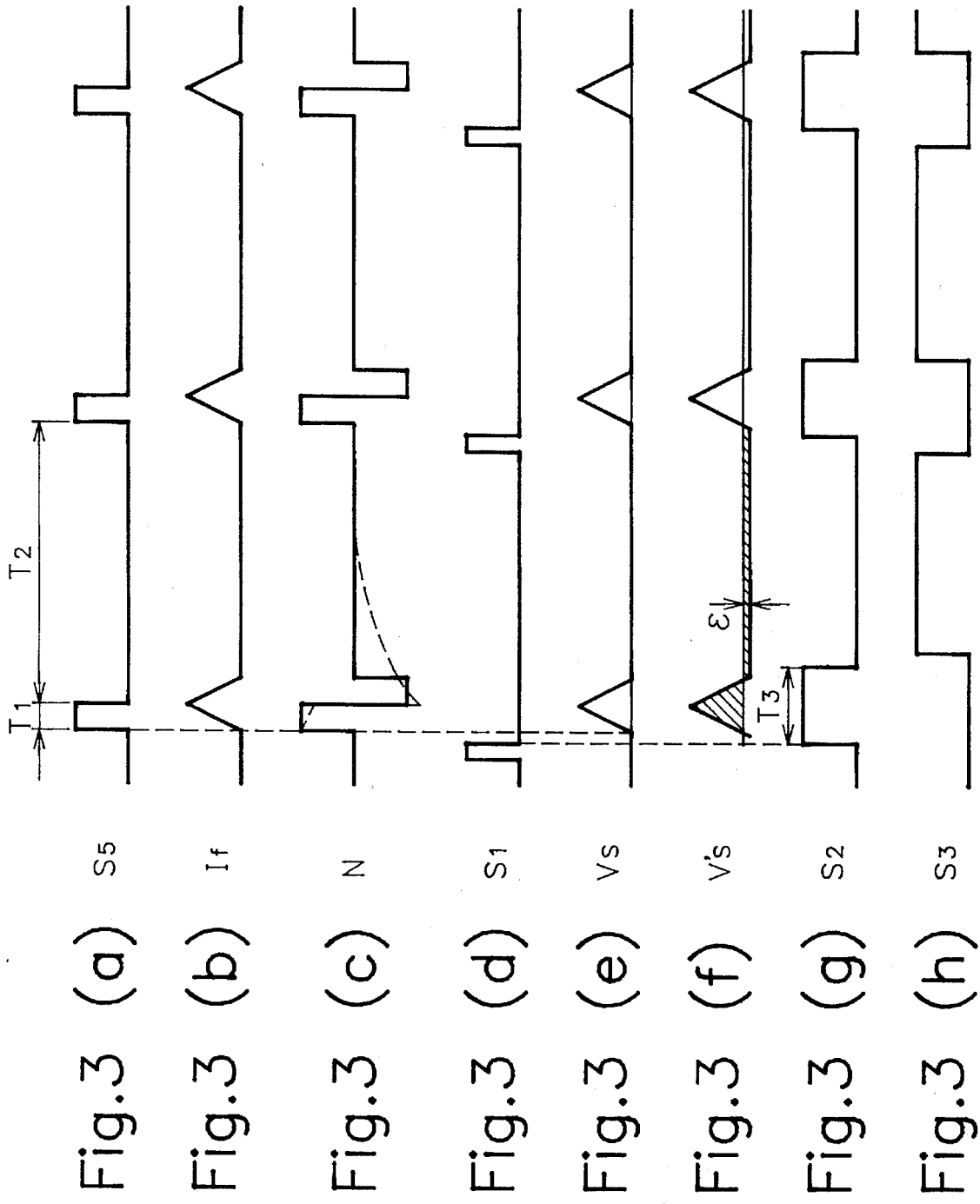

ELECTROMAGNETIC FLOWMETER

BACKGROUND OF THE INVENTION

1. Field of Invention

This invention relates to an electromagnetic flow meter for converting the flow rate of a fluid to be measured to an electrical signal and for outputting a flow rate signal corresponding to the flow rate through detecting electrodes; and more particularly, to a power efficient flow meter which has increased signal to noise ratio (S/N) and reduced energy requirements for excitation and signal processing.

2. Description of the Related Art

Conventional electromagnetic flowmeters are known which intermittently supply an exciting current to an exciting coil to reduce the excitation energy.

One example is an electromagnetic flow meter disclosed in Japan Published Unexamined Application SN 54/115,163, wherein the flowmeter uses low frequency excitation in which the excitation period is shorter than the non-excitation period to reduce the mean power consumption. However, in this example, since signal sampling occurs after the differential noise, due to the increased excitation, disappears, the ON period ($\tau$ON) of the excitation becomes long. Hence, the excitation cycle also becomes long when a predetermined repetition cycle is attempted. This results in the disadvantage that response is slow.

Another example is an electromagnetic flowmeter disclosed in Japan Published Unexamined Application SN 55/33,685, wherein a two-wire electromagnetic flowmeter uses power transmitted as a current signal from a DC power supply on the load side to the transmitter side through two transmission lines. In this flowmeter, the power supply supplies all of the power required at the transmitter side, and the detected flow rate signal is transmitted as a current signal to the load side through the transmission lines. In this example, power consumption is low, but, there is a problem in that the power for excitation is large and response is slow.

A further example is disclosed in Japan Published Unexamined Application SN 55/76,912, wherein an external signal is monitored, for example a signal representing the electrode potential, and excitation is made only when a variation exists in the electrode potential, thereby to reduce the overall excitation power. In this example, since the flowmeter carries out signal sampling when a steady-state value is obtained, the time taken for the steady-state value to be reached becomes long, which leads to the disadvantage that the power of excitation is large.

Another example is disclosed in Japan Published Unexamined Application SN 62/113,019, wherein positive and negative pulse-like exciting currents are supplied to an exciting coil, and signals are sampled during the time, including each excitation period and until the differential noise disappears, thereby to remove the differential noise, and a flow rate signal is obtained from the voltage difference between the positive and negative excitation levels by synchronous rectification. In this example, the flowmeter cannot uniquely determine the attenuation of the differential noise. Accordingly, if the sampling period is set to be sufficiently long, the noise, during this period, increases to thereby degrade the signal-to-noise ratio. On the other hand, if this period is set to be short, the effect of the differential noise appears. In addition, since a synchronous rectification is performed, signal processing in the low frequency region is necessary. Moreover, since the synchronous rectification by the sample values based on first and second reference pulses and the calculation of the difference between them are required, there is the problem that the hardware and software required to carryout the functions are complex.

SUMMARY OF THE INVENTION

Accordingly, an object of the invention is to overcome the foregoing and other deficiencies and disadvantages of the prior art.

The foregoing and other objects are attained by the invention, which encompasses an electromagnetic flowmeter for converting the flow rate of a fluid to be measured to an electric signal and for outputting a flow rate signal corresponding to the flow rate through detecting electrodes, and comprising exciting means for intermittently causing an exciting current to flow thereby to apply a magnetic field to the fluid being measured, the excitation period of the exciting means being shorter than the non-excitation period thereof; AC coupling means for obtaining an AC signal through an AC coupling of the interelectrode signals outputted from the detecting electrode; sample and hold means for sampling and holding the AC signal with a sampling signal having a sampling width, including the portions before and after the excitation period, and for outputting the resulting signal as a hold signal; switching means for switching to a reference potential before and after the period of sampling and holding; and signal processing means for using the hold signal to perform signal processing and for outputting the processed signal as the flow rate signal.

BRIEF DESCRIPTION OF THE DRAWINGS

FIGS. 3(a)–3(h) are waveform diagrams for explaining the operation of the embodiment of FIG. 1.

DETAILED DESCRIPTION OF THE PREFERRED EMBODIMENTS

Figure 1:
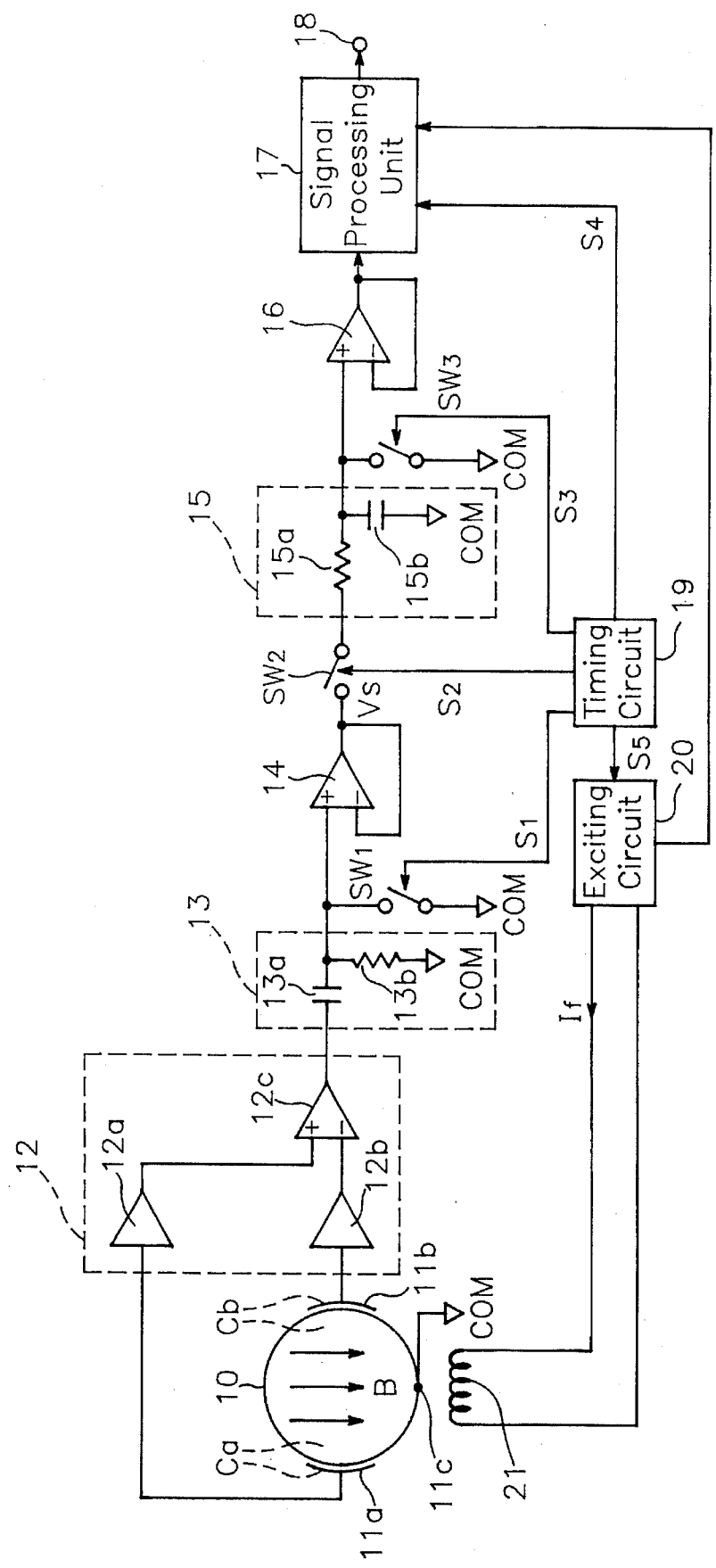
FIG. 1 is a block diagram depicting an illustrative embodiment of the invention.

FIG. 1 shows the construction of an illustrative embodiment comprising an insulating conduit 10 in which an electrically conductive fluid to be measured Q flows. The description is of a capacitance type electromagnetic flowmeter which detects the flow rate of a fluid to be measured through use of capacitance. Detecting electrodes 11a,11b are fixed to conduit 10 so as to be insulated from the liquid to be measured Q, and coupled thereto through capacitance $C_a$, $C_b$. A ground electrode 11c, in contact with the fluid, is connected to common potential point COM.

A preamplifier 12, comprising buffer amplifiers 12a,12b, and a differential amplifier 12c, is connected to detecting electrodes 11a, 11b, via the input terminals of buffer amplifiers 12a,12b, as depicted. The output terminals of buffer amplifiers 12a,12b are connected to the input terminals of differential amplifier 12c, respectively. The output terminal of differential amplifier 12c is connected to a high pass filter 13, which functions as an AC coupling means. High pass filter 13 is selected to have sufficient band pass for the excitation waveform.

High pass filter 13 comprises a capacitor 13a and a resistor 13b, one terminal of capacitor 13a being connected to the output terminal of differential amplifier 12c, and the other terminal of capacitor 13a being connected to the common potential point COM through resistor 13b.

The junction of capacitor 13a and resistor 13b is connected to an input terminal of a buffer amplifier 14, and to the common potential point COM through a switch $SW_1$, the opening and closing of which are controlled by a control signal $S_1$ from timing circuit 19.

The output terminal of buffer amplifier 14 is connected to a hold circuit 15 through a switch $SW_2$, the opening and closing of which are controlled by a control signal $S_2$ from timing circuit 19. The hold circuit 15 comprises a resistor 15a and a capacitor 15b. One terminal of resistor 15a is connected to $SW_2$, while the other terminal thereof is connected to common potential point COM through capacitor 15b.

The junction of resistor 15a and capacitor 15b is connected to an input terminal of a buffer amplifier 16 and to the common potential point COM through switch $SW_3$, the opening and closing of which are controlled by a control signal $S_3$ from timing circuit 19.

The output terminal of buffer amplifier 16 is connected to a signal processing unit 17. Signal processing unit 17 may comprise an analog-to-digital converter, a microprocessor, a memory, etc, and calculates and outputs a flow rate signal to an output terminal 18.

Timing circuit 19 outputs control signals $S_1 - S_5$ to switches $SW_1$, $SW_2$, $SW_3$, signal processing unit 17, and excitation circuit 20, respectively, to control the opening and closing of the respective switches, and the control of the respective unit and circuit. Excitation circuit 20 is controlled by control signal $S_5$ for the switching timing thereof so that, for example, circuit 20 controls the waveform of an exciting current $I_f$ flowing through an exciting coil 21 to be a triangular wave, and further controls the repetition cycle of the switching.

Figure 2:
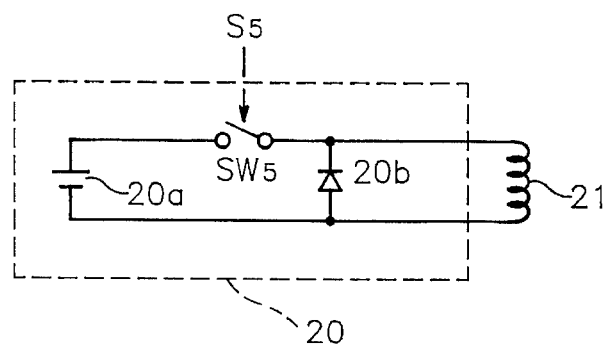
FIG. 2 is a circuit diagram depicting details of the excitation circuit of FIG. 1.

Excitation circuit 20, in one embodiment, comprises, for instance, a DC power supply 20a, a switch $SW_5$, a diode 20b, and the like, a shown in FIG. 2, and the opening and closing of the switch $SW_5$ is controlled by control signal $S_5$ to generate a quasi-triangular wave, which is provided to exciting coil 21. The DC power supply 20a may be formed of, for example, a battery of the type which can be or need not be recharged.

The operation of the embodiment of FIG. 1 is described below with reference to the waveform diagrams shown in FIGS. 3(a)–3(h) and 4. Timing circuit 19 sends out to excitation circuit 20, control signal $S_5$ which repeats an excitation period $T_1$ and a non-excitation period $T_2$, as shown in FIG. 3(a).

Figure 4:
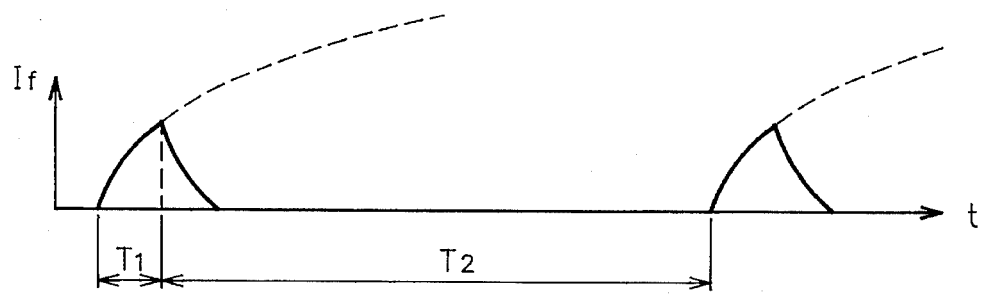
FIG. 4 is a waveform diagram for explaining the operation of the excitation circuit of FIG. 2.

By this control signal $S_5$, switch $SW_5$ shown in FIG. 2, is controlled to be turned ON during the excitation period $T_1$ and to be turned OFF during the excitation peiod $T_2$, respectively. When switch $SW_5$ is turned ON, excitation current $I_f$ increases from DC power supply 20a to the exciting coil 21 during excitation period $T_1$ and with a time constant determined by resistance $R_f$ and inductance $L_f$, as shown in FIG. 4.

However, when excitation period $T_1$ elapses, switch $SW_5$ is turned OFF. Thus, the energy supply from DC power supply 20a is stopped, the energy stored in exciting coil 21 is discharged through diode 20b, and exciting current $I_f$ decreases as shown in FIG. 4. When non-excitation period $T_2$ elapses, switch $SW_5$ is again turned ON, and energy is supplied from DC power supply 20a to excitation coil 21.

Then, by repeating the foregoing steps, a quasi-triangular wave is supplied to exciting coil 21. In FIG. 3(b), exciting current $I_f$ shaped as a triangular wave is obtained in a manner just discussed and depicted.

When exciting current $I_f$, shaped in a triangular wave form, is made to flow through exciting coil 21, as described, a magnetic field having a magnetic flux density B of a shape substantially similar to the triangular waveform is applied to the fluid to be measured Q, and a signal voltage $e_s$ having a similar waveform is generated in the fluid to be measured Q.

Since magnetic flux density B is interlinked with the signal line loop connecting detecting electrodes 11a and 11b with the preamplifier 12, a superposed differential noise N generated according to the change in magnetic flux density B appears between detecting electrodes 11a, 11b, in addition to signal voltage $e_s$. The waveform of the differential noise N is shown by a solid line in FIG. 3(c).

As described above, since the electrode capacity is very small, usually several tens to several thousands pF, in detecting the signal voltage by detecting electrodes 11a,11b, through capacitances Ca and Cb, shown in FIG. 1, the charging/discharging time constant of the electrode impedance due to the eddy current generated in the fluid Q becomes sufficiently small. Thus, the differential noise N becomes the only component, shown by a solid line in FIG. 3(c), which is proportional to the time differential of the excitation current.

On the other hand, the waveform shown by a dashed line in FIG. 3(c) is for the conventional liquid-contact type electromagnectic flowmeter. In the instance in which the detecting electrodes are put in contact with a fluid, the electrode capacity formed by the detecting electrodes and the fluid to be measured is as large as 0.1 to 10 μF, and the electrochemical surface condition of the detecting electrode is unstable. Thus, by the effect of the eddy current flowing in the fluid, the waveform takes a long tail like shape as shown by the dashed line in FIG. 3(c).

The voltage ($e_s$+N) generated between detecting electrodes 11a,11b, as described above is supplied to buffer amplifier 14 through preamplifier 12 and high pass filter 13.

Output voltage $V_s$, shown in FIG. 3(e), which corresponds to voltage ($e_s$+N) appearing at the output terminal of buffer amplifier 14, is integrated and, sampled and held in hold circuit 15 by turning ON switch $SW_2$ for a fixed time $T_3$ by means of control signal $S_2$ (see FIG. 3(g)) for sampling.

It is only necessary that the fixed time $T_3$ be initiated earlier than the rise of the excitation interval, shown in FIG. 3(a) and be given a time width of an extent that the differential noise N shown in FIG. 3(c) disappears.

In this case, before sampling the output voltage $V_s$ in hold circuit 15 by turning On switch $SW_2$, the output terminal of high pass filter 13 is reset by turning On switch $SW_1$, by use of control signal $S_1$, as shown in FIG. 3(d), and it is fixed to a reference potential. By performing such reset operation, the signal voltage generated correspondingly to excitation period $T_1$ starts exactly at the reference potential at the common point COM, as shown in FIG. 3(e), even if there is a DC voltage change in the detecting electrodes 11a, 11b, or preamplifier 12.

Accordingly, output voltage $V_s$ shown in FIG. 3(e) is integrated in hold circuit 15 for fixed time $T_3$ shown in FIG. 3(g). Thus, a voltage accurately proportional to the flow rate is obtained. In addition, differential noise N, shown in FIG. 3(c), does not affect the output since the positive and negative components of differential noise N are offset to zero.

Furthermore, by setting fixed time $T_3$, shown in FIG. 3(g), to an integral multiple of the period of the commercial frequency of the site where the detector is installed, the positive and negative waveforms of the commercial frequency can be cancelled to remove the induction noise due to the commercial frequency.

Hold circuit 15 is made ready for the next signal processing by turning ON switch $SW_3$ by means of control signal $S_3$, shown in FIG. 3(h), to discharge capacitor 15b. The sampling voltage obtained in this manner is outputted to signal processing unit 17 through buffer amplifier 16.

Signal processing unit 17 receives information on the control (of the exciting current to be outputted from timing circuit 19 to exciting coil 20) through control signal $S_4$, and calculates and outputs the instantaneous flow rate, integrated flow rate, or the like to the output terminal 18 according to the application of the flowmeter. In addition, it can also obtain the value of exciting current $I_f$ from exciting circuit 20 and calculate the ratio of the signal value and the exciting current value in the flow rate calculation, thereby compensating for the span.

Moreover, in the conventional flowmeter in which the reset operation by switch $SW_1$ is not performed, a change, with the time constant of the high pass filter 13, occurs until the point when the diagonally shaded upper and lower portions of DC potential in FIG. 3(f) generated from preamplifier 13, or the like, balances each other. Since the remaining amount $\epsilon$ with a polarity opposite to the signal in this case depends on the magnitude of the signal voltage $e_s$, a simple signal sampling during the fixed time $T_3$ may cause an error.

Moreover, generally, if the excitation level is lowered to achieve low power consumption, the signal to noise ration (S/N) is decreased and the output fluctuation is increased. In addition, the amplitude of the analog signal of the flow rate signal, sampled for each excitation, is largely varied by noise. Accordingly, the dynamic range of the analog to digital converter included in the signal processing unit 17 must be made large, by which process the resolution is reduced.

However, in the embodiment of FIG. 1, the output fluctuation can be reduced by constructing hold circuit 15 of a low pass filter and adding a damping to the sample voltage sampled by switch $SW_2$ so that such inconvenience can be avoided. In this case, if the ON/OFF time ratio of the switch $SW_2$ is assumed to be $\beta$, the damping $\beta$ multiplied by the time constant of the hold circuit 15 is added in this portion.

Figure 5:
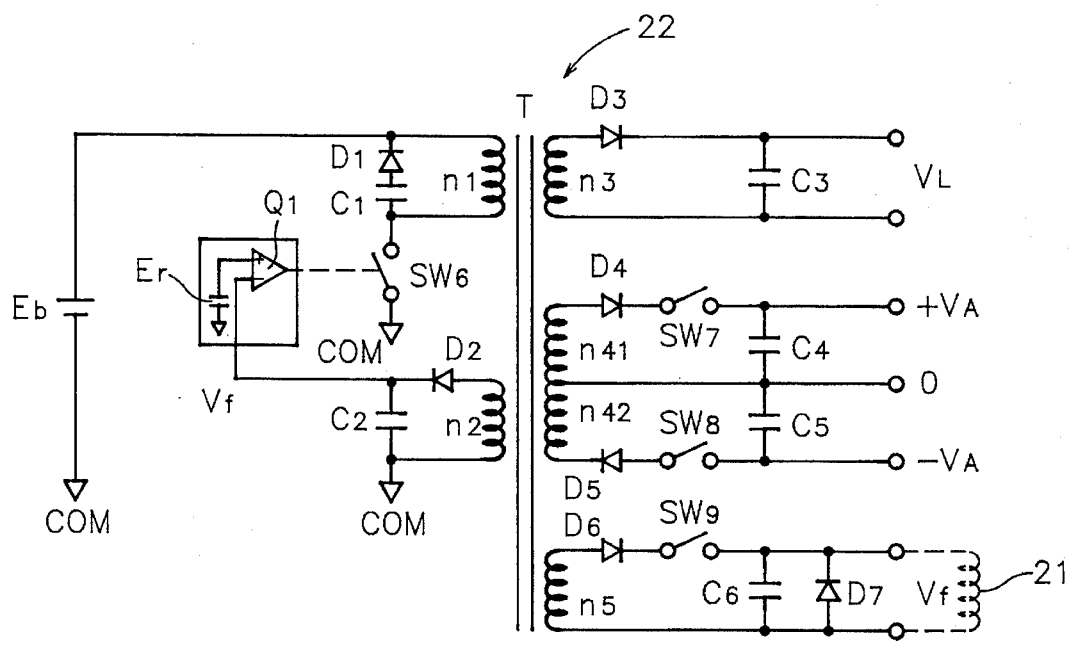
FIG. 5 is a power supply circuit diagram depicting details of the DC power supply, including the excitation circuit of FIG. 1.

FIG. 5 shows a power supply circuit 22 comprising a DC power supply $E_b$ connected to common potential point COM through primary coil $n_1$ of a transformer T and switch $SW_6$. To both ends of primary coil $n_1$, a diode $D_1$ and a capacitor $C_1$ are connected in series.

Also, to both ends of feedback coil $n_2$ of transformer T, a diode $D_2$ and a capacitor $C_2$ are connected in series, and a feedback voltage $V_f$, generated across capacitor $C_2$, is applied to the inverting input terminal (−) of a deviation amplifier $Q_1$. The non-inverting input terminal (+) of deviation amplifier $Q_1$ has applied thereto a reference voltage $E_r$. The ON/OFF control of switch $SW_6$ is effected by the output of deviation amplifier $Q_1$.

To secondary coil $n_3$ of transformer T, a diode $D_3$ and a capacitor $C_3$ are connected in series, and a logic voltage $V_L$ is obtained from the ends of capacitor $C_3$. The logic voltage $V_L$ is normally turned On and used as the voltage of a power supply for generating each timing signal.

Tertiary coil $n_4$ of transformer T comprises coils $n_{41}$ and $n_{42}$ which are connected in series. Between the junction of coils $n_{41}$ and $n_{42}$ and the other end of coil $n_{41}$, a diode $D_4$, a switch $SW_7$, and a capacitor $C_4$ are connected in series. From both ends of the capacitor $C_4$, a positive voltage $+V_A$ is obtained as the voltage for an analog power supply.

In addition, between the junction of coils $n_{41}$ and $n_{42}$ and the other end of coil $n_{42}$, a diode $D_5$, a switch $SW_8$, and a capacitor $C_5$ are connected in series. From both ends of capacitor $C_5$, a negative voltage $-V_A$ is obtained as the voltage for the analog power supply.

To fourth coil $n_5$ of transformer T, a diode $D_6$, a switch $SW_9$ and a capacitor $C_6$ are connected in series, and a diode $D_7$ is connected in parallel with capacitor $C_6$. From both ends of capacitor $C_6$ an exciting voltage $V_f$ is obtained.

Switches $SW_7$ to $SW_9$ are turned ON only in the vicinity of the intermittent excitation to supply power to a load, respectively, switches $SW_1$ to $SW_9$ are otherwise turned OFF to achieve overal power saving. As the DC power supply $E_b$, a battery or the like can be used.

Furthermore, deviation amplifier $Q_1$ performs ON/OFF control of switch $SW_6$ so that a voltage corresponding to reference voltage $E_r$ is generated, thereby to supply a fixed voltage from the secondary coil to the fourth coil $n_5$ in response to the status of the load.

The above description assumes that the waveform of the excitation current $I_f$ is a quasi-triangular wave from, but, this is only by way of example, and is not intended to be restrictive of the invention. FIGS. 6(a)–6(d) show other examples of the excitation waveform.

Figure 6:
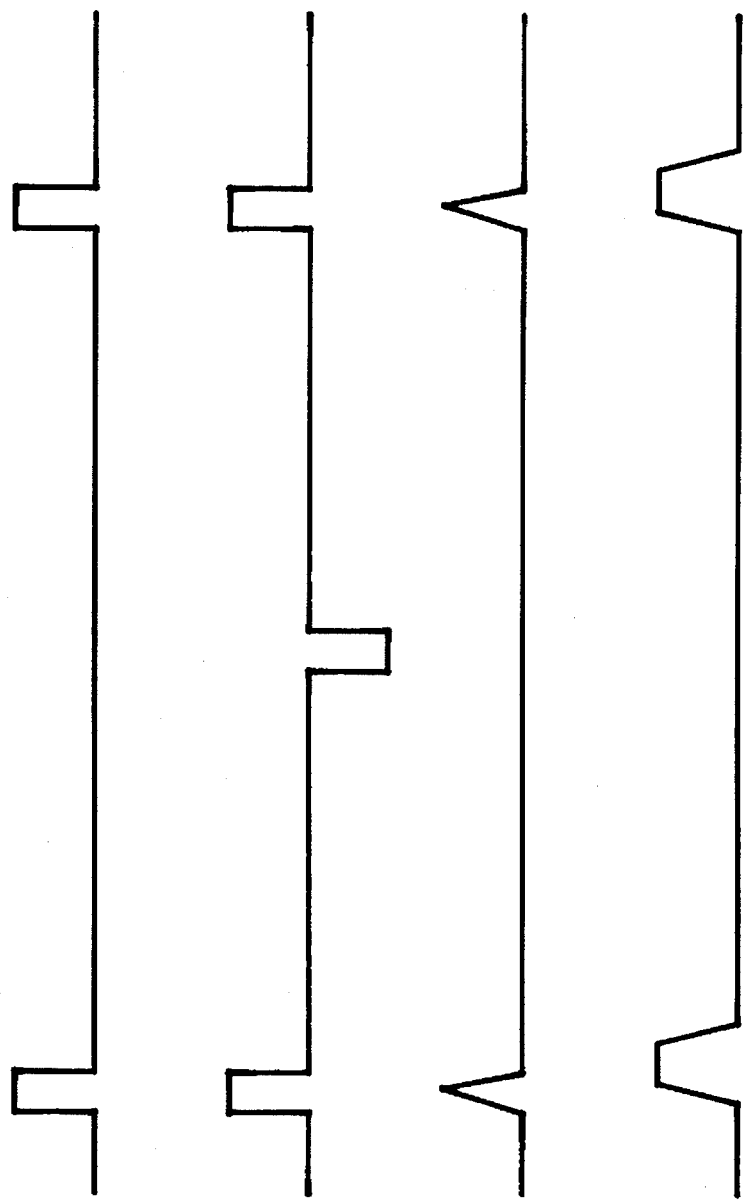
FIGS. 6(a)–6(d) are waveform diagrams for explaining other waveforms of the exciting current of FIG. 1.

FIG. 6(a) shows a rectangular excitation waveform, and FIG. 6(b) shows positive and negative rectangular excitation waveforms which are alternately inserted. The amount of signals can be doubled by performing synchronous rectification between the positive and negative excitations.

Furthermore, FIG. 6(c) shows a triangular excitation waveform which can simplify the exciting circuit. FIG. 6(d) shows an example of a trapezoidal excitation waveform. When the excitation pulse is shortened, the rectangular excitation shown in FIG. 6(a) also assumes a trapezoidal wave excitation.

Figure 7:
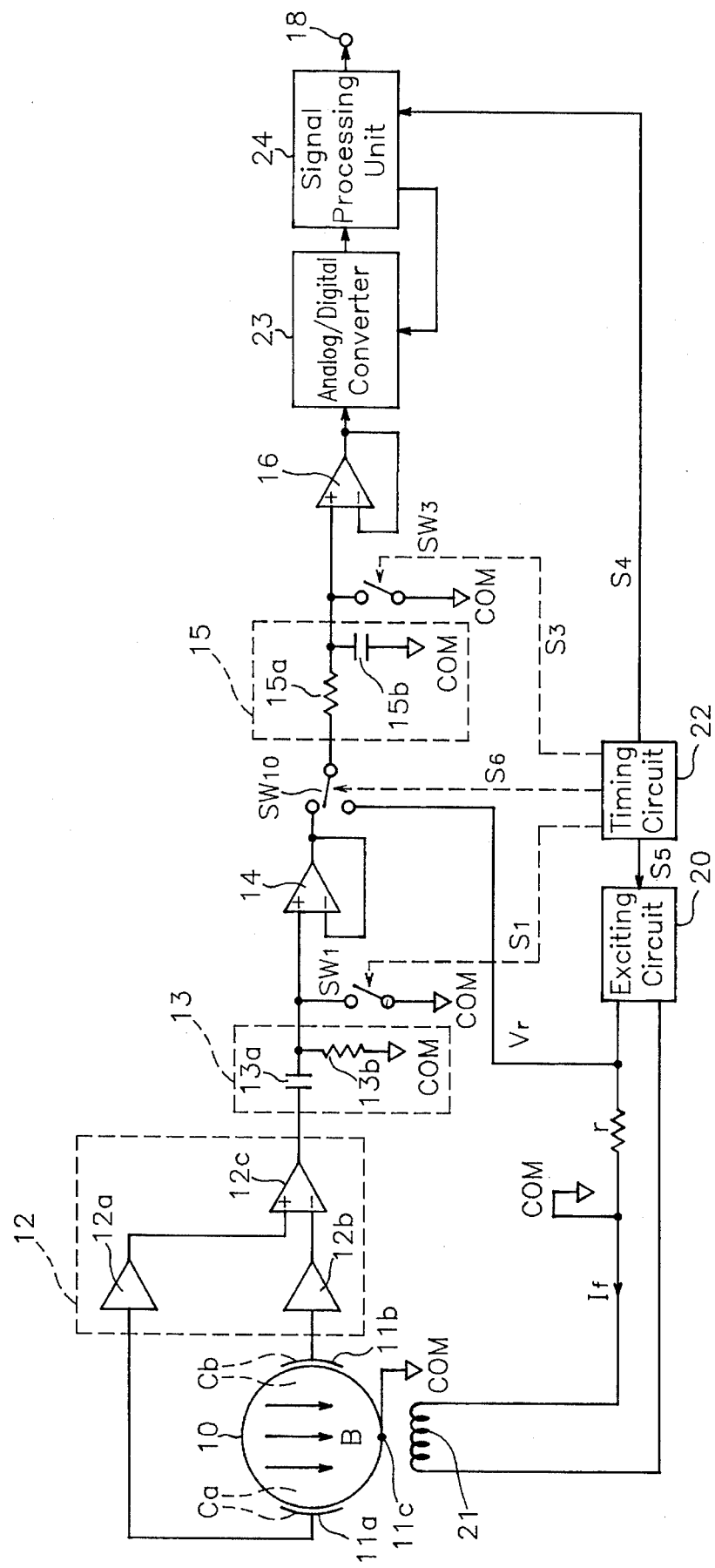
FIG. 7 is a block diagram depicting another illustrative embodiment.

FIG. 7 shows another illustrative embodiment, wherein the reference voltage for the exciting current value is taken at a predetemined cycle, and the reference voltage is used to calculate the ratio to the signal voltage by use of software, thereby compensating for span variation.

The portions having the same symbols as those shown in FIG. 1 have the same symbols and description hereat is omitted for sake of convenience. A reference resistance r is connected in series to exciting coil 21 in the embodiment of FIG. 1 and a reference voltage $V_r$ is taken out from both ends of resistance r and applied to one switching terminal of switch $SW_{10}$. Normally, the common terminal of switch $SW_{10}$ is connected to one of the switching terminals by a control signal $S_6$ outputted from a timing circuit 22, thereby to sample a signal voltage $e_s$ in a hold circuit 15. In addition, switch $SW_{10}$ is switched to the other switching terminal thereof by control signal $S_6$ at a period, longer than the sampling period of the signal $e_s$ and reference voltage $V_r$ is sampled in hold circuit 15. This sampling value is converted to a digital signal in an analog-to-digital converter 23 through a buffer amplifier 16, supplied to a signal processing unit 24, and stored in a predetermined region of the memory contained in unit 24.

In this case, signal processing unit 24 has the same construction as the signal processing unit 17 of FIG. 1 except that the portion corresponding to the analog-to-digital converter 23 is removed. Signal processing unit 24 uses this to calculate the ratio of the digital signal to the signal voltage $e_s$ by use of software, and outputs the ratio to an output terminal 18 as a flow rate signal. This allows compensataion of the span variation.

The foregoing method has the following advantages. First, since hold circuit 15, buffer amplifier 16, and analog-to-digital converter 23 equally contribute to the flow rate signal and reference voltage $V_r$, the effect of the drift of each element is removed. Second, since only one hold circuit 15 and one buffer amplifier 16 are required, respectively, the hardware configuration is simplified.

In the embodiment of FIG. 1, switch $SW_1$ is turned ON for resetting immediately before the signal sampling. But, it is also possible to keep switch $SW_1$ ON during the non-excitation period and change switch $SW_1$ to be OFF during the period between before and after the excitation period of the signal.

Figure 8:
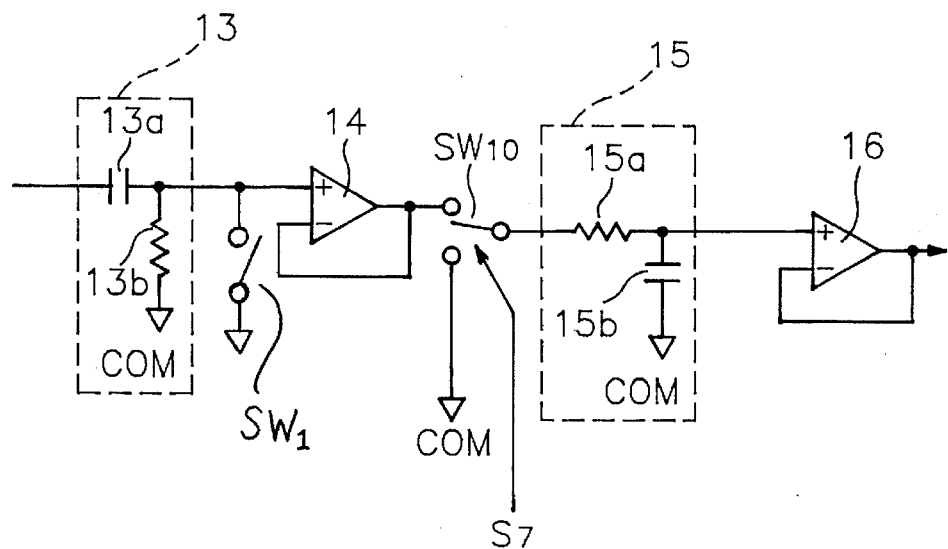
FIG. 8 is a block diagram depicting a further illustrative embodiment of the invention.

In addition, in the embodiment of FIG. 1, two switches $SW_2$ and $SW_3$ are used, but, this may be replaced by one switch $SW_{10}$ which is switched by a control signal $S_7$, such as shown in FIG. 8. This combines the signal sampling and the resetting of the hold circuit 15. Specifically, control signal $S_7$ is a control signal such as obtained by integrating control signals $S_1$ and $S_3$. It is normally switched to the reference voltage of the common potential point COM side and controlled to switch to the output terminal of buffer amplifier 14 only for the signal sampling.

Figure 9:
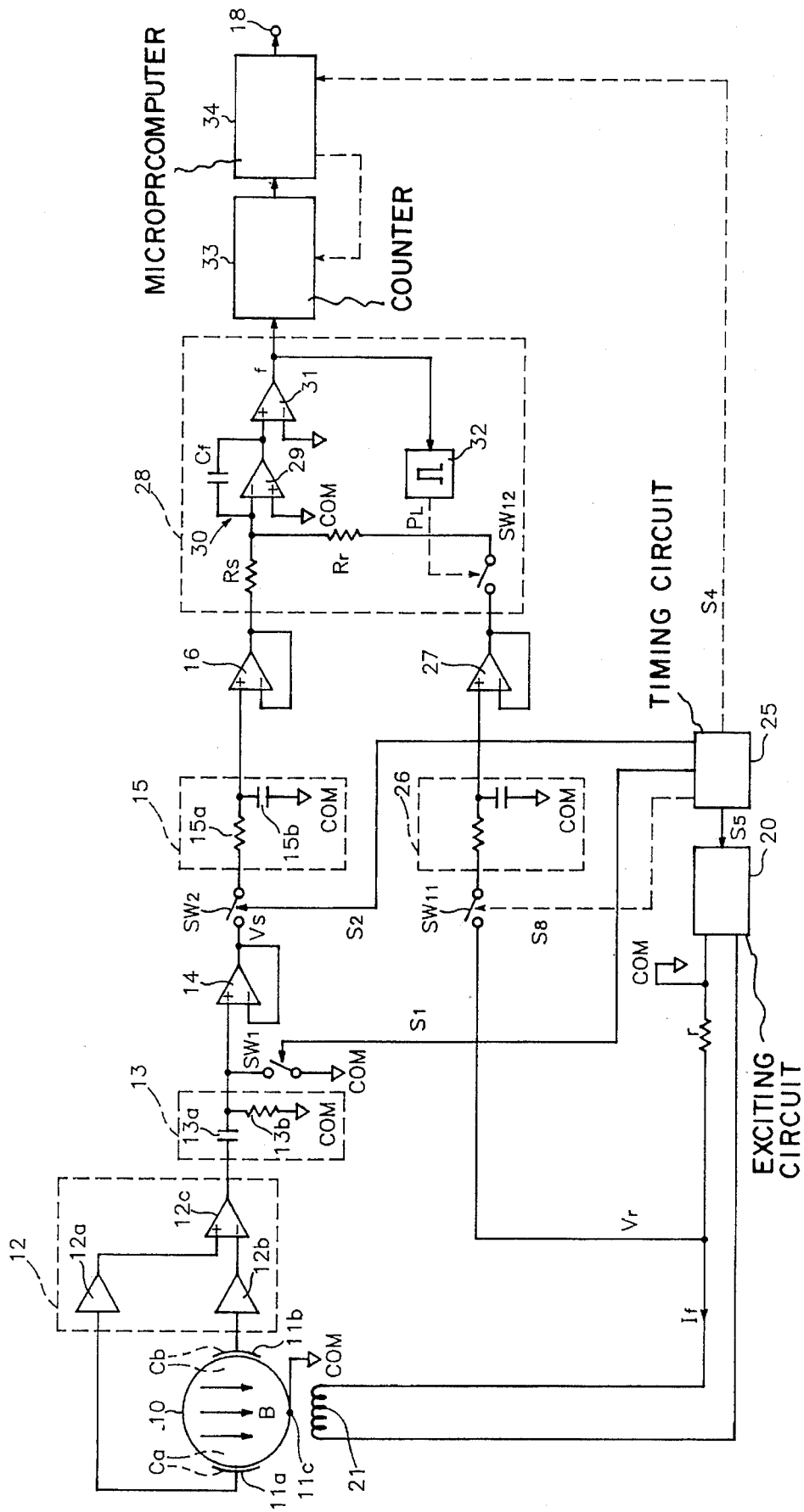
FIG. 9 is a block diagram depicting still another illustrative embodiment of the invention.

FIG. 9 shows a reference voltage $V_r$ detected in a reference resistance r, held in a hold circuit 26 through a switch $SW_{11}$ for sampling which is controlled by a control signal $S_8$ outputted from a timing circuit 25, and taken out through a buffer amplifier 27.

A voltage/frequency converter circuit 28 comprises resistances $R_s$ and $R_r$; an integrator 30 comprises an operational amplifier 29, the non-inverting input terminal (+) of which is connected to the common potential point COM and the inverting input terminal (−) is connected to the output terminal by a capacitor $C_f$; a comparator 31; a one shot circuit 32; and a switch $SW_{12}$.

Moreover, the outputs of buffer amplifiers 16, 27 are applied to the inverting input terminal (−) of operational amplifier 29 through resistances $R_s$ and $R_r$, and switch $SW_{12}$, respectively. The output of operational amplifier 29 is applied to the non-inverting input terminal (+) of comparator 31, the inverting input terminal (−) of which is connected to the common potential terminal COM. The output of comparator 31 is outputted to a counter 33 and also applied to one shot circuit 32.

Switch $SW_{12}$ is turned ON for a fixed time by a pulse outputted from one shot circuit 32. The count in counter 33 is periodically read by a microcomputer 34. In the above embodiment, the flow rate signal is integrated in integrator 30 through resistance $R_s$. When the integrated output reaches a fixed level, comparator 31 operates and a pulse $P_L$ having a fixed time width τ is outputted from one shot circuit 32.

Pulse $P_L$ turns ON switch $SW_{12}$ for the fixed time τ to cause reference voltage $V_r$, having a polarity opposite to the flow rate signal, to be inputted to integrator 30 through resistance $R_r$, thereby to reset integrator 30 and comparator 31.

By the above operation, frequency f generated at the output of comparator 31 is expressed by the following:

$$f=(R_r V_{sp}/R_s V_{rp})$$

if it is assumed that $V_{sp}$ is the hold voltage held in hold circuit 15 and $V_{rp}$ is the hold voltage held in hold circuit 26. Thus, frequency signal f, which is independent of capacitor $C_f$ for integration or the variation of the operation voltage of the circuit can be obtained.

In addition, a control signal $S_8$ turns ON switch $SW_{11}$ with a timing similar to control signal $S_2$ or $S_6$ during any period in which control signal $S_2$ is not turned ON, thereby to sample the reference voltage. Microcomputer 34 periodically reads in a count value corresponding to the ratio of the flow rate voltage of the counter 33 and the reference voltage thereby to obtain the flow rate.

Since the embodiment of FIG. 9 is constructed so as to perform the calculation of the rate of the flow rate voltage and the reference voltage by use of hardware, the burden on the software of the microcomputer 34 can be reduced as compared with the processing method by use of software such as used in FIG. 7.

The reduction of the burden can lengthen the operation time in the low power consumption mode of the microprocessor, such as the sleep mode provided to the recent low power consumption type microprocessor, thereby to reduce the power consumption to, for example, ⅕ to ½.

Although the above embodiments were based on a capacitance type electromagnetic flowmeter, other types may be used. For example, the liquid contact type electromagnetic flowmeter, in which the detecting electrodes are in contact with the fluid to be measured, can be used as described below with reference to FIG. 10.

Figure 10:
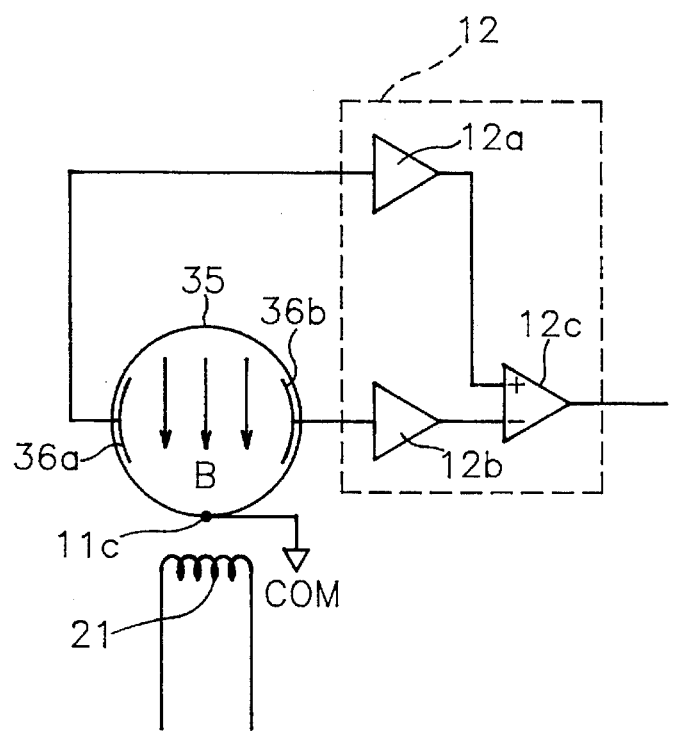
FIG. 10 is a partial block diagram depicting a modified detector means of the embodiment of FIG. 1.

FIG. 10 shows the arrangement in the vicinity of a flow rate detecting unit of the liquid contact type flowmeter. To a conduit 35, detecting electrodes 36a, 36b are disposed to contact the fluid to be measured Q. The remaining arrangement is similar to FIG. 1.

For the capacitance type flowmeter, since the electrode capacity is very small, the charging/discharging time constant of the electrode impedance due to the eddy current occurring in the fluid to be measured Q is sufficiently small. Thus, that type of flowmeter can be used even if a fast response, with a short repetition cycle of excitation, is required.

On the other hand, for the liquid contact type, since the electrode capacity formed by the detecting electrodes 36a, 36b, and the fluid to be measured Q is large, the differential noise N trails as shown by the dotted line in FIG. 3(c). Thus, a long excitation period is needed and a fast response cannot be expected.

However, for an application which permits a slow response, for instance, for an application as an integrating flowmeter, such as a water meter, by resetting switch $SW_1$, disposed after high pass filter 13, with a predetermined timing when the differential noise N disappears, the initial value of the integration can accurately be set to zero at the initial stage of the integration by hold circuit 15, so that good signal to noise ratio can be obtained.

For example, in particular, as the flow meter for city water for measuring the amount of water being used, a flow meter, the total power consumption of which is about 1 mW, can be achieved if the ON/OFF ratio of excitation is set to about 1/100 or less and a state-of-the-art low power device is used.

If the power consumption is as small as described above, an electromagnetic flowmeter requiring no external wiring can be constructed by using a battery as a driving power supply. Thus, the measuring of the flow rate can be performed in areas where there is no readily available power source.

In addition, in the event that a battery is used as a driving power supply, even if the output deviation from the signal to noise level in the measurement of the instantaneous flow rate becomes somewhat large, it is possible to achieve a flow meter which can be used acceptably as a water meter for measuring an integrated flow rate.

The invention has the following and other advantages and effects. For example, in accordance with the invention described in claims 1,3,4,5,6, an exciting current is caused to intermittently flow with the excitation period being shorter than the non-excitation period, thereby to apply a magnetic field to a fluid to be measured, the inter-electrode signals outputted from detecting electrodes being coupled by AC coupling to obtain an AC signal, which is sampled and and held by a sampling signal, and switching being performed to a reference potential before and after the period of sampling and holding. Thus, by not performing synchronous rectification, a flow rate signal can be sampled without causing an error. Also, it is possible to increase the signal-to-noise ratio while maintaining the power saying function.

In addition to the advantages described with reference to claim 1, the invention described in claim 2 has the following effects. Since the device is arranged as a capacitance type, the electrode capacity is small and the charging/discharging time constant of the electrode impedance by the eddy current occurring in the fluid to be measured becomes small. Thus, the differential noise is rapidly attenuated and the signal can be detected while removing the differential noise with a short sampling width, and the signal can be processed in a frequency band of good S/N against a flow noise having 1/f characteristics while assuring a fast response with a short repetition cycle of excitation.

In accordance with the invention described in claims 7,8,9, since a triangular wave or a quasi-triangular wave can be created by applying a voltage to the exciting coil and turning OFF the exciting current rising in the exciting coil with appropriate timing, the exciting circuit can be simplified and the power consumed for excitation can be made small.

In accordance with the invention described in claims 10,11,12, sine an arrangement is provided for calculating the ratio of the sampling signal and the reference voltage, the span error due to the variation of the exciting current can be easily removed.

In accordance with the invention described in claims 13,14,15, since an arrangement is provided in which the switching cycle of the sample switch on the reference voltage side is a fraction of that on the AC signal side, the response to a flow rate change is fast while correcting the span due to the reduction of the capacity of a battery or the like.

In accordance with the invention described in claims 16,17,18, since the power supply voltage for the analog circuit can be supplied in the period corresponding to the sampling width, or the excitation period, the power saving is substantial.

In accordance with the invention described in claim 19, since a flowmeter containing a battery can be constructed, no external wiring is required and the measuring of the flow rate can be performed even in areas where no power source is available.

In accordance with the invention described in claim 20, since the calculation of the ratio of flow rate signal to reference signal can be carried out using a single piece of hardware, such as a voltage/frequency converter, the burden of software calculations in the microcomputer can be reduced, and the power consumption can be reduce.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. An electromagnetic flowmeter for converting flow rate of a fluid to be measured to an electric signal and for outputting a flow rate signal corresponding to said flow rate through detecting electrodes, said electromagnetic flowmeter comprising:

exciting means for intermittently causing an exciting current to flow thereby to apply a magnetic field to said fluid, an exciting period of said exciting current being shorter than a non-exciting period thereof;

AC coupling means for obtaining an AC signal through an AC coupling of inter-electrode signals outputted from said detecting electrodes;

first sample and hold means for sampling and holding said AC signal with a sampling signal having a sampling width including portions before and after said excitation period, and for outputting the resulting sampled and held signal as a first hold signal;

switching means for switching the output of said first sample and hold means to a reference potential before and after said period of sample and hold; and signal processing means for processing said hold signal and for outputting the resulting signal as said flow rate signal.

2. The flowmeter of claim 1, wherein said detecting electrodes detect flow rate through use of capacitance.

3. The flowmeter of claim 2, wherein said switching means comprises a first switching means for switching said AC signal and said reference potential by use of a first switching signal, and second switching means for switching said hold signal and said reference potential by use of a second switching signal at a time after said sample and hold processing step.

4. The flowmeter of claim 2, wherein a waveform of said exciting current is at least partially triangular in shape.

5. The flowmeter of claim 1, wherein said detecting electrodes detect flow rate through contact with said fluid to be measured.

6. The flowmeter of claim 5, wherein said switching means comprises a first switching means for switching said AC signal and said reference potential by use of a first switching signal, and second switching means for switching said hold signal and said reference potential by use of a second switching signal at a time after said sample and hold processing step.

7. The flowmeter of claim 5, wherein a waveform of said exciting current is at least partially triangular in shape.

8. The flowmeter of claim 1, wherein said switching means comprises a first switching means for switching said AC signal and said reference potential by use of a first switching signal, and second switching means for switching said hold signal and said reference potential by use of a second switching signal at a time after said sample and hold processing step.

9. The flowmeter of claim 1, wherein a waveform of said exciting current is at least partially triangular in shape.

10. The flowmeter of claim 1, wherein a battery is used as a driving power supply for said exciting means and said signal processing means.

11. An electromagnetic flowmeter for converting a flow-rate of a fluid to be measured to an electrical signal and for outputting a flow rate signal corresponding to said flow rate through detecting electrodes, said electromagnetic flowmeter comprising:

exciting means for intermittently causing an exciting current to flow thereby to apply a magnetic field to said fluid to be measure, an exciting period of said exciting current being shorter than a non-exciting period thereof;

AC coupling means for obtaining an AC signal through an AC coupling of inter-electrode signals outputted from said detecting electrodes;

first sample and hold means for sampling and holding said AC signal with a first sampling signal having a sampling width including portions before and after said excitation period, and for outputting results of said sampling and holding as a first hold signal;

switching means for switching to a reference potential before said period of sample and hold;

second sample and hold means for sampling and holding a reference voltage proportional to said exciting current with a second sampling signal and for outputting resulting sample and hold signal as a second hold signal;

voltage/frequency converter means for neutralizing said first hold signal with said second hold signal to calculate and output ratio of said first and second hold signals as a frequency signal;

counter means for counting said frequency signal; and computer means for periodically reading results of said counting and for calculating and outputting a flow rate signal.

12. An electromagnetic flowmeter for converting flow rate of a fluid to be measured to an electric signal and for outputting a flow rate signal corresponding to said flow rate through detecting electrodes, said electromagnetic flowmeter comprising:

exciting means for intermittently causing an exciting current to flow thereby to apply a magnetic field to said fluid, an exciting period of said exciting current being shorter than a non-exciting period thereof;

AC coupling means for obtaining an AC signal through an AC coupling of inter-electrode signals outputted from said detecting electrodes;

first sample and hold means for sampling and holding said AC signal with a sampling signal having a sampling width including portions before and after said excitation period, and for ouputting the resulting sampled and held signal as a first hold signal;

switching means for switching the output of said first sample and hold means to a reference potential before and after said period of sample and hold;

signal processing means for processing said hold signal and for outputting the resulting signal as said flow rate signal;

second sample and hold means for switching from said AC signal to a reference voltage propertional to said exciting current, sampling and holding said reference voltage with said sampling signal, and for outputting the resulting sampled and held signal as a second hold signal; and ration cancellation means for using said first and second hold signals to calculate a ratio of said reference voltage and said AC signal.

13. The flowmeter of claim 12, wherein the switching cycle of said sample switch on said reference voltage side is a fraction of the switching cycle of said sample switch on said AC signal side.

14. The flowmeter of claim 12, wherein said switching means comprises a first switching means for switching said AC signal and said reference potential by use of a first switching signal, and second switching means for switching said hold signal and said reference potential by use of a second switching signal at a time after said sample and hold processing step.

15. The flowmeter of claim 12, wherein said exciting means comprises a battery used as a driving power supply, and wherein said signal processing comprises a battery used as a driving power supply.

16. The flowmeter of claim 12, wherein a waveform of said exciting current is at least partially triangular in shape.

17. The flowmeter of claim 12, wherein said detecting electrodes detect flow rate through use of capacitance.

18. The flowmeter of claim 17, wherein the switching cycle of said sample switch on said reference voltage side is a fraction of the switching cycle of said sample switch on said AC signal side.

19. The flowmeter of claim 12, wherein said detecting electrodes detect flow rate through contact with said fluid to be measured.

20. The flowmeter of claim 19, wherein the switching cycle of said sample switch on said reference voltage side is a fraction of the switching cycle of said sample switch on said AC signal side.

21. An electromagnetic flowmeter for converting flow rate of a fluid to be measured to an electric signal and for outputting a flow rate signal corresponding to said flow rate through detecting electrodes, said electromagnetic flowmeter comprising:

exciting means for intermittently causing an exciting current to flow thereby to apply a magnetic field to said fluid, an exciting period of said exciting current being shorter than a non-exciting period thereof;

AC coupling means for obtaining an AC signal through an AC coupling of inter-electrode signals outputted from said detecting electrodes;

first sample and hold means for sampling and holding said AC signal with a sampling signal having a sampling width including portions before and after said excitation period, and for ouputting the resulting sampled and held signal as a first hold signal;

switching means for switching the output of said first sample and hold means to a reference potential before and after said period of sample and hold;

signal processing means for processing said hold signal and for outputting the resulting signal as said flow rate signal;

an analog signal processing unit disposed preceding said signal processing means; and power supply means for supplying a voltage to only said analog signal processing unit only during a period substantially corresponding to said sampling width.

22. The flowmeter of claim 21, wherein said detecting electrodes detect flow rate through use of capacitance.

23. The flowmeter of claim 21, wherein said detecting electrodes detect flow rate through contact with said fluid to be measured.

24. The flow meter of claim 21, wherein said switching means comprises a first switching means for switching said AC signal and said reference potential by use of a first switching signal, and second switching means for switching said hold signal and said reference potential by use of a second switching signal at a time after said sample and hold processing step.

25. The flow meter of claim 21, wherein said exciting means comprises a battery used as a driving power supply, and wherein said signal processing means comprises a battery used as a driving power supply.

26. The flowmeter of claim 21, wherein a waveform of said exciting current is at least partially triangular in shape.

* * * * *